8 Sheets—Sheet 3.

J. POLLOCK.
Carving-Machine.

No. 211,107. Patented Jan. 7, 1879.

Attest:
Geo. T. Smallwood Jr.
Walter Allen

Inventor:
John Pollock
By Knight Bros. Attys.

8 Sheets—Sheet 4.

J. POLLOCK.
Carving-Machine.

No. 211,107. Patented Jan. 7, 1879.

Attest:
Geo. T. Smallwood Jr.
Walter Allen

Inventor:
John Pollock
By Knight Bros. Attys

N. PETERS, PHOTO-LITHOGRAPHER, WASHINGTON, D.C.

8 Sheets—Sheet 6.

J. POLLOCK.
Carving-Machine.

No. 211,107.     Patented Jan. 7, 1879.

Attest:
Geo. T. Smallwood Jr.
Walter Allen

Inventor:
John Pollock
By Knight Bros. Attys.

J. POLLOCK.
Carving-Machine.
No. 211,107. Patented Jan. 7, 1879.
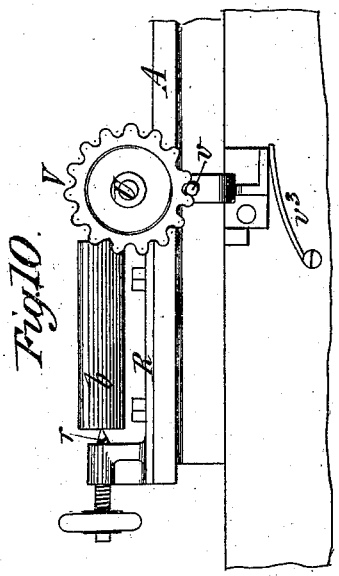
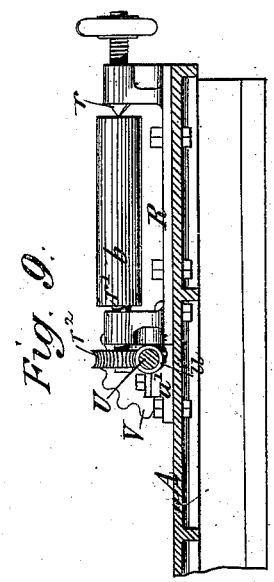
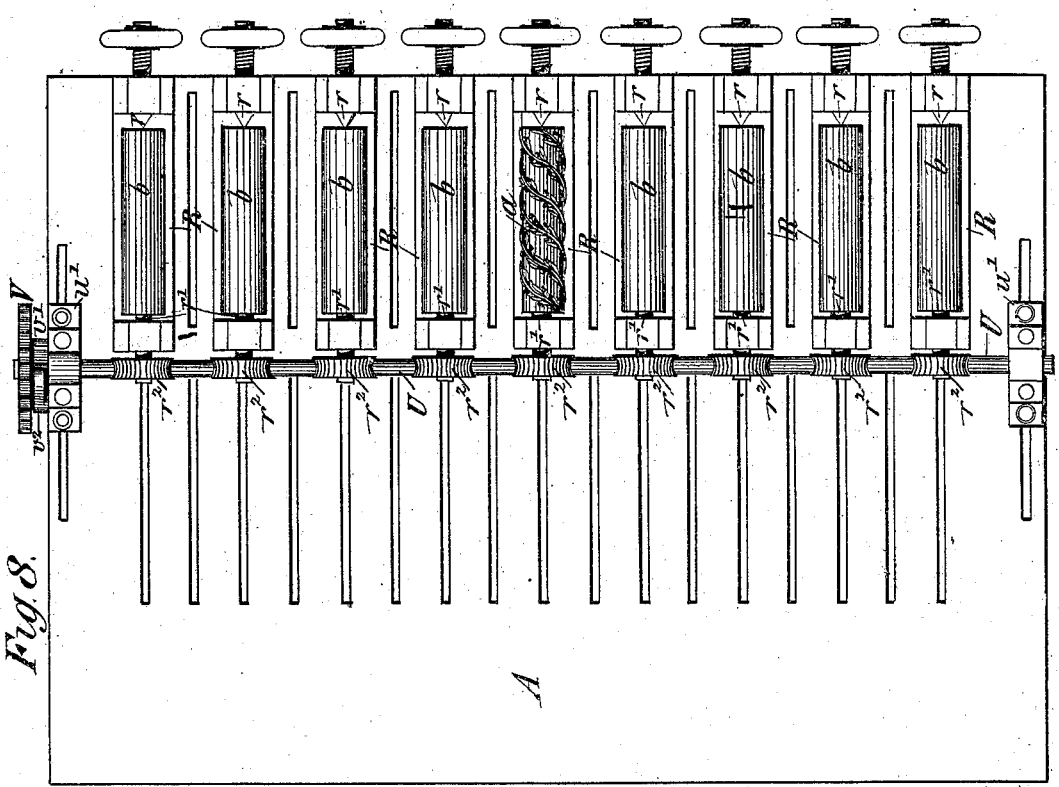
Attest: Geo. T. Smallwood Jr.
Walter Allen
Inventor: John Pollock
By Knight Bros Attys J. POLLOCK.
Carving-Machine.
No. 211,107. Patented Jan. 7, 1879.
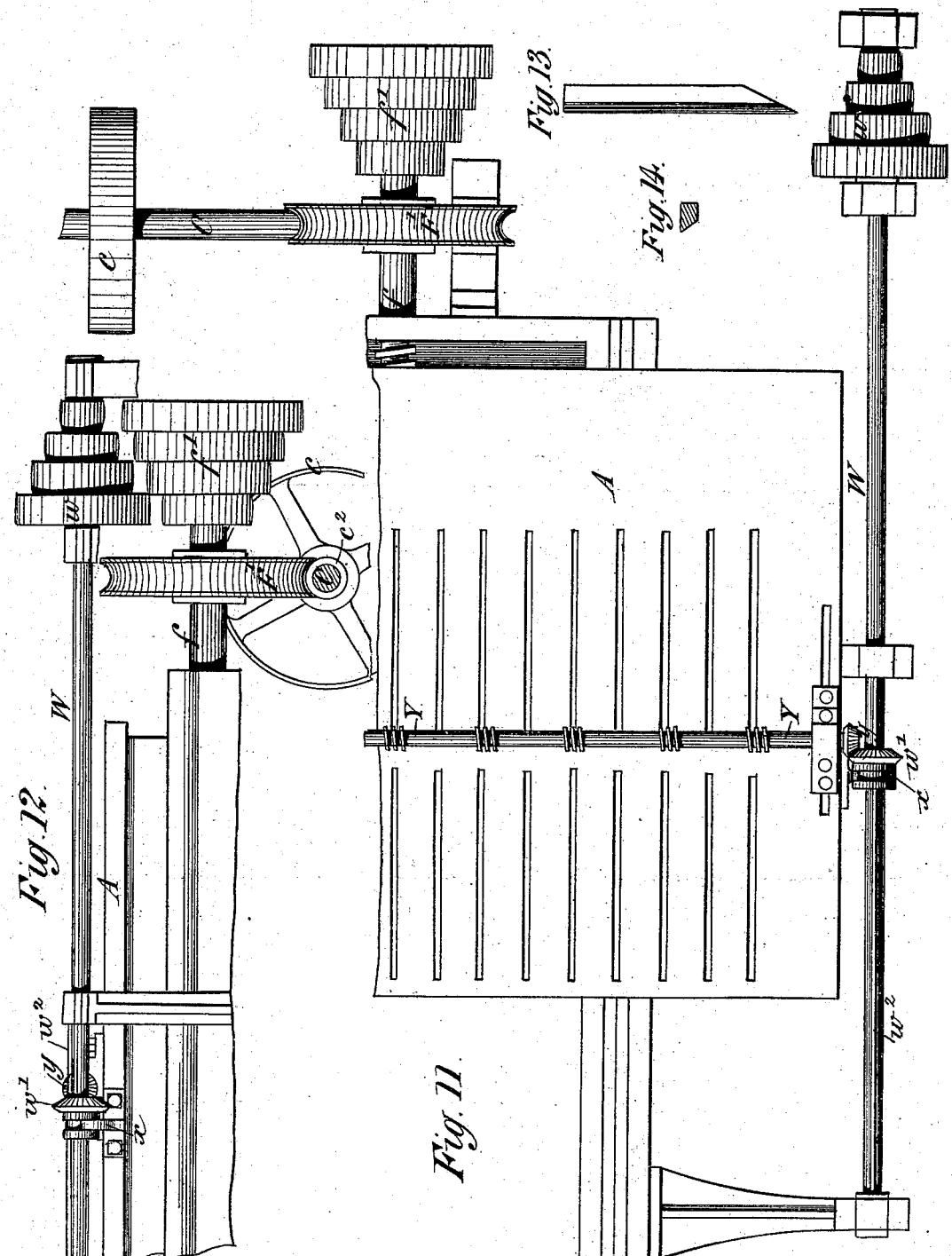

UNITED STATES PATENT OFFICE.

JOHN POLLOCK, OF BEITH, NORTH BRITAIN.

IMPROVEMENT IN CARVING-MACHINES.

Specification forming part of Letters Patent No. 211,107, dated January 7, 1879; application filed August 2, 1878.

*To all whom it may concern:*

Be it known that I, JOHN POLLOCK, of the firm of M. & J. Pollock, of Beith, in the county of Ayr, North Britain, cabinet and chair manufacturer, have invented Improvements in Machinery or Apparatus for Carving Wood, Stone, and other Materials, of which the following is a specification:

My said invention relates to a new or improved machine for carving wood, stone, metal, or other substances, and has for its object to produce a number of copies of any given design at one operation with rapidity and certainty.

Figure 1:
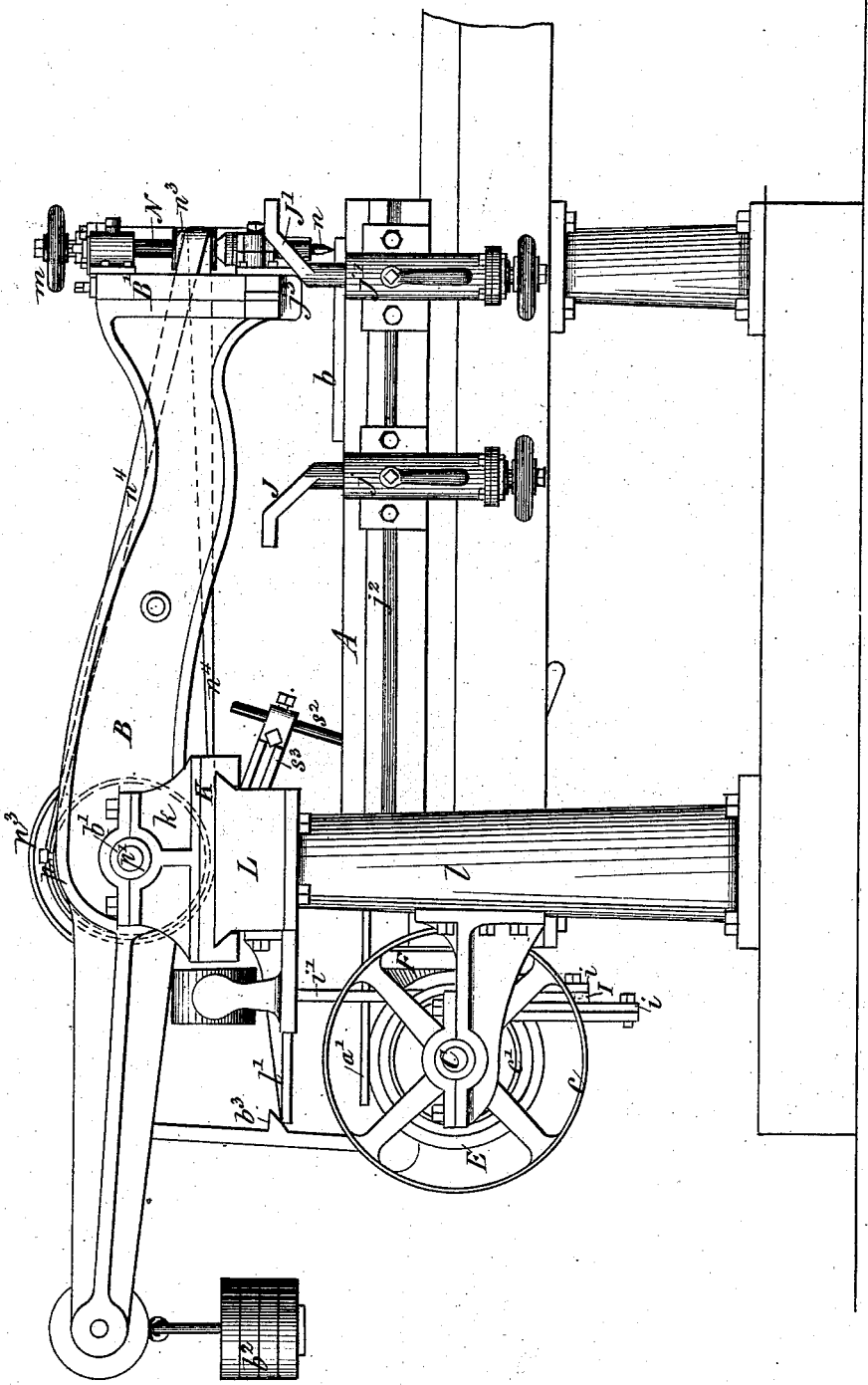
Figure 2:
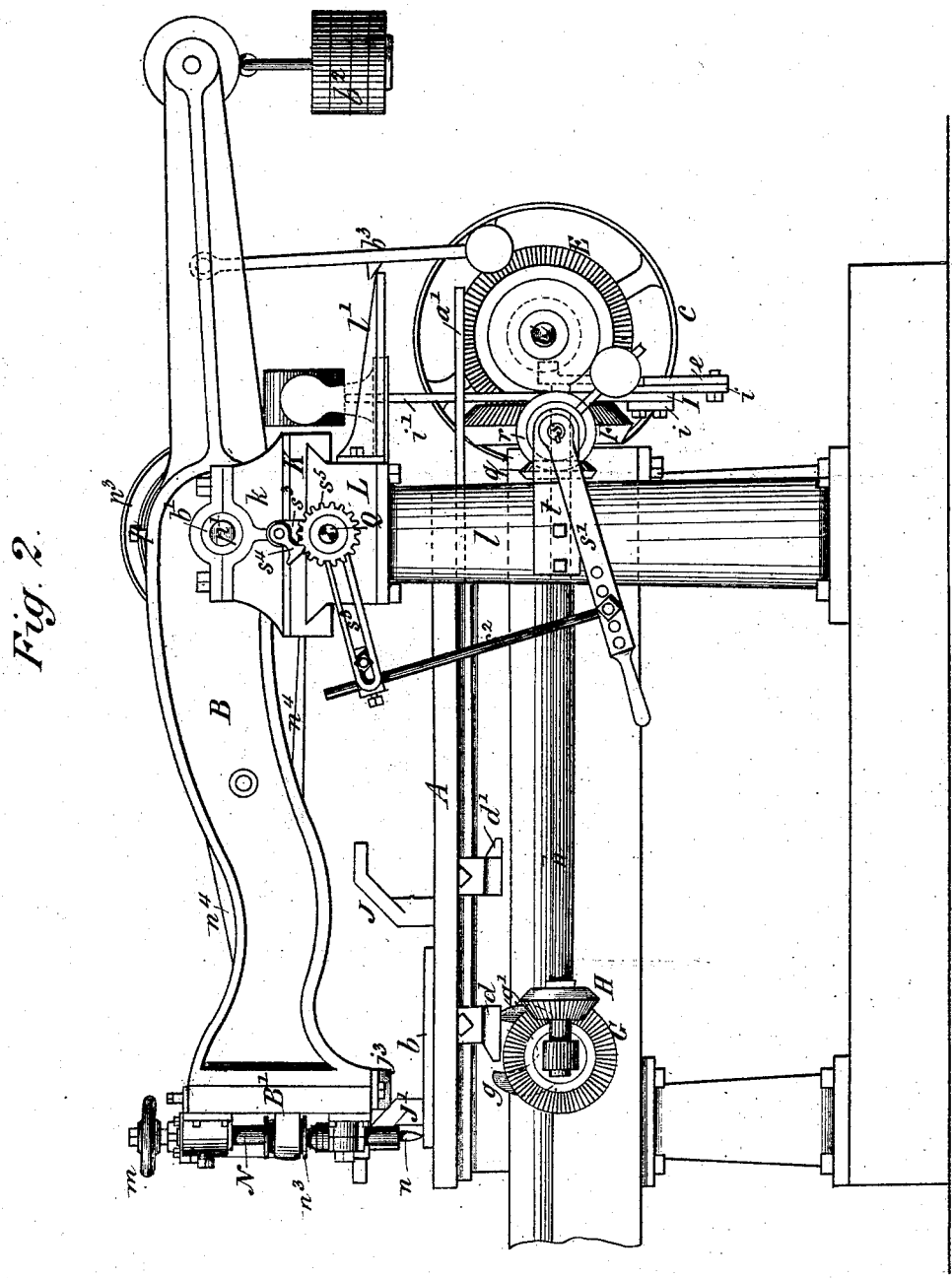
Figure 3:
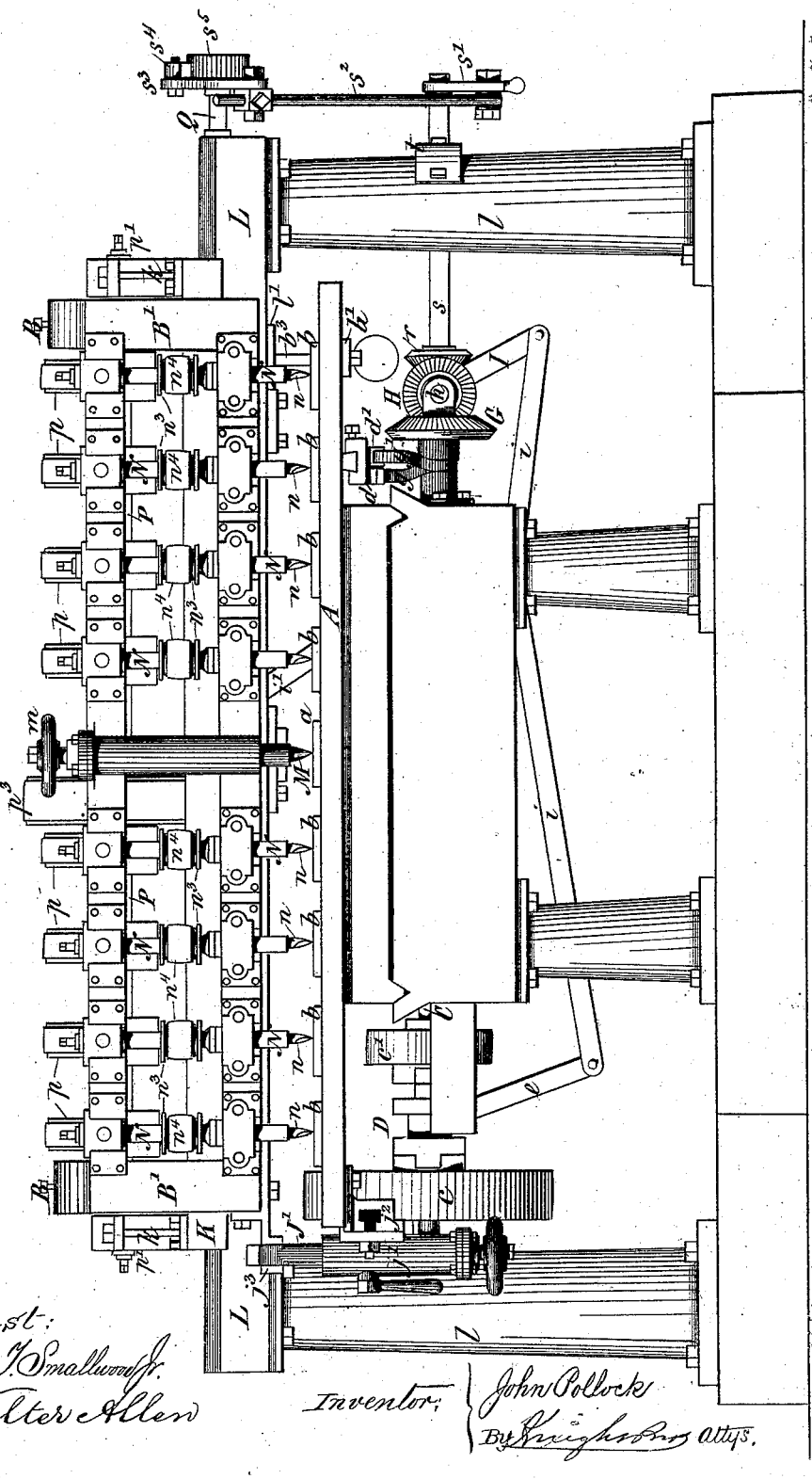
Figure 4:
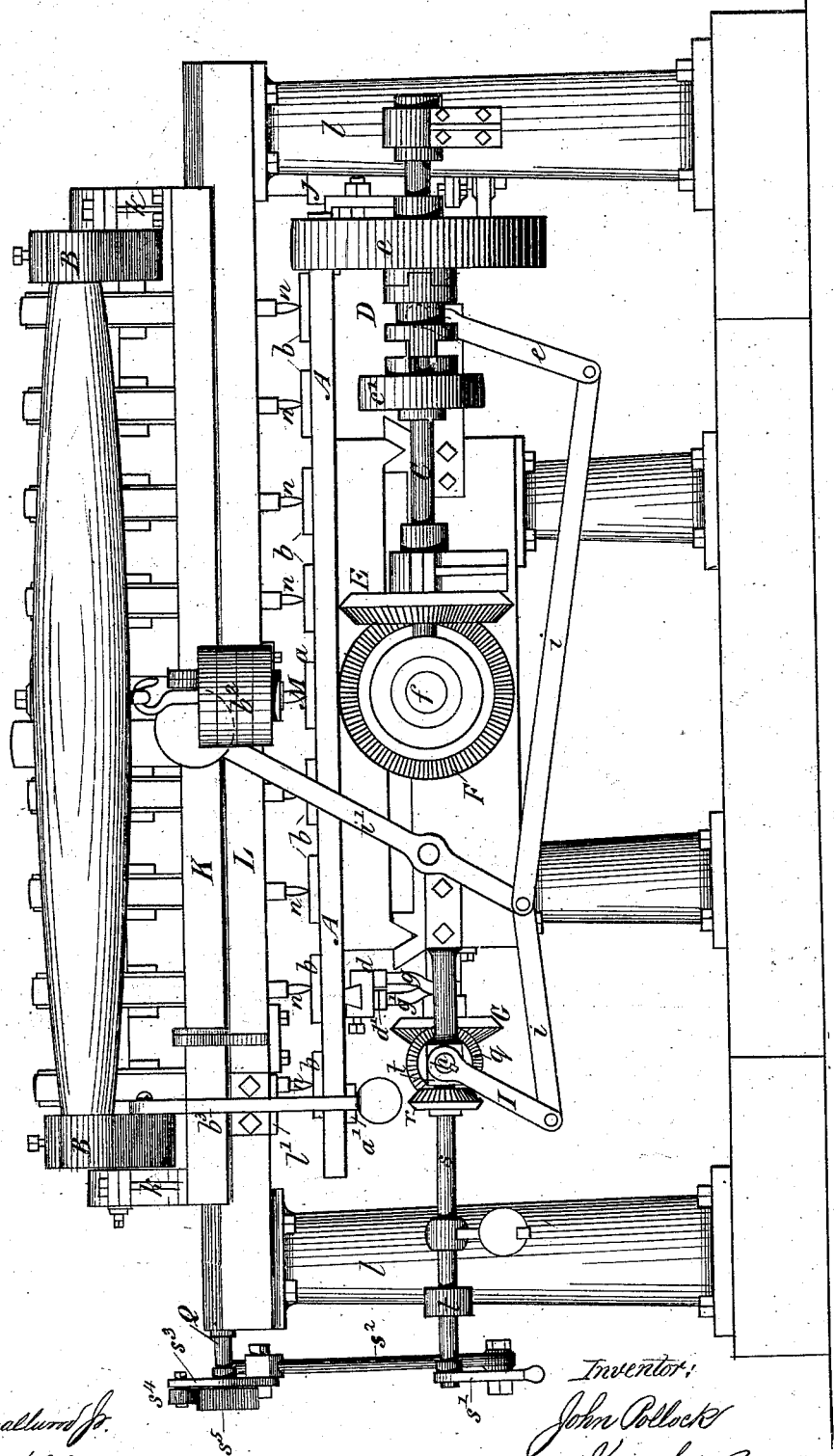
Figure 5:
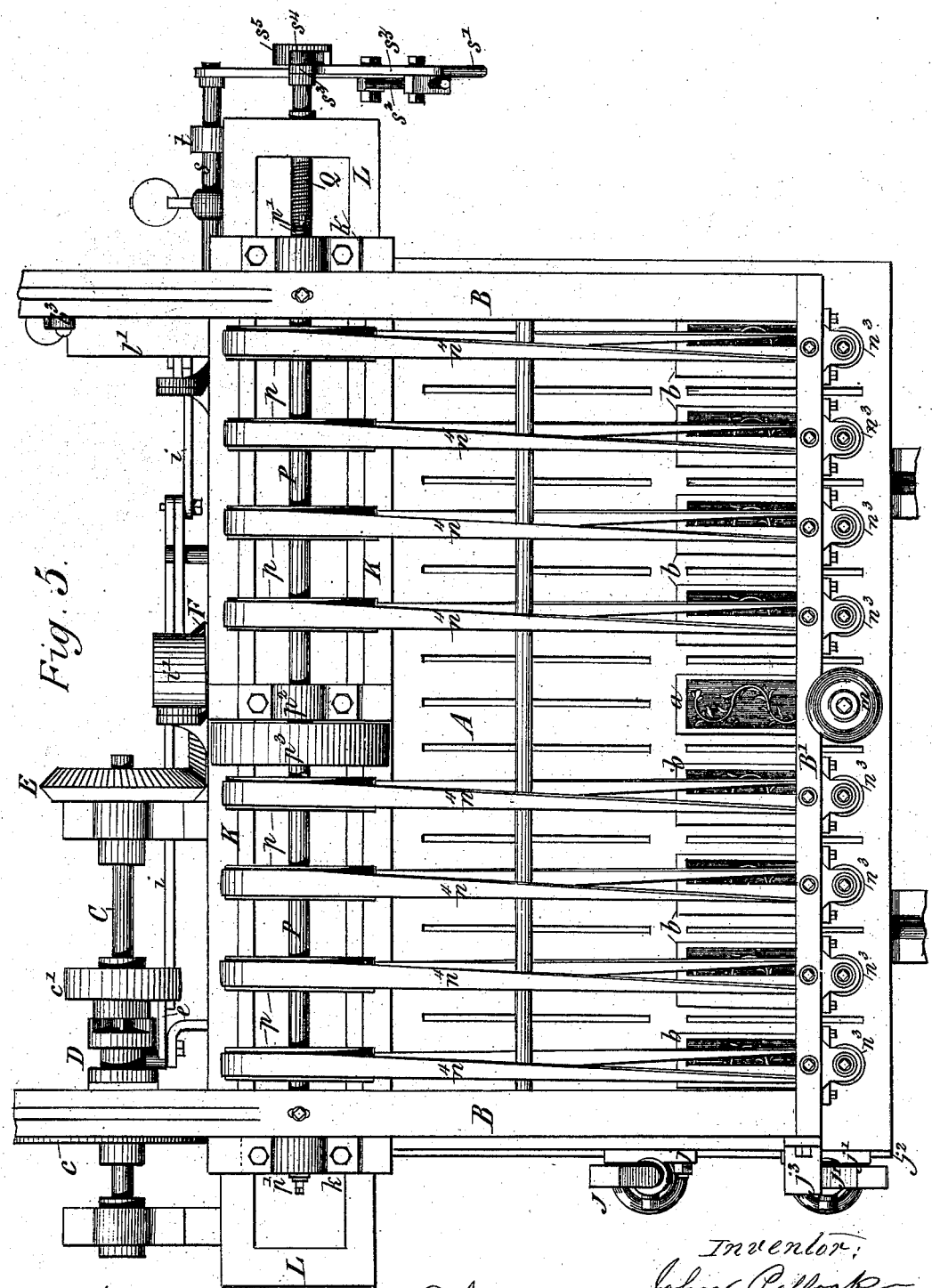

Figures 1 and 2 of the accompanying drawings represent side elevations (taken at opposite sides of the machine) constructed according to my said invention, for reproducing upon flat surfaces, or upon curved surfaces—such, for instance, as the backs of chairs—designs in relief or intaglio. Fig. 3 represents a front elevation, Fig. 4 a back elevation, and Fig. 5 a plan, of the same. The remaining figures represent details and modifications, hereinafter described.

The bed-plate or table A is mounted, and capable of sliding, in a V-shaped groove, as is the bed-plate of an ordinary planing-machine, such as is used for planing metals. Upon this bed-plate are carried the pattern $a$, (of cast-iron or other suitable hard material,) and the pieces of wood or other material, $b$, upon which the design of the pattern is to be reproduced, the said pattern and pieces of wood or other material being held firmly upon the said table by dogs or equivalent clamps. (Not shown in the drawings.)

The bed-plate has backward and forward motions imparted to it from the driving-shaft C by means of bands driving any convenient shafting, and passing over pulleys $c$ and $c^1$. The one pulley, $c$, is for driving the bed-plate forward during the operation of the tools, and is of large diameter, so as to give a slow forward movement to the table. The other pulley, $c^1$, is of smaller diameter, for driving the bed-plate or table backward at a higher rate of travel while the tools are not operating. One or other of these pulleys is driven by an open band, and the other by a crossed band, so that on each traverse of the bed-plate, the clutch D being geared alternately with the one and the other of the clutch-boxes of the said pulleys, the bed-plate is driven alternately backward and forward by the bevel-wheel E on the shaft C gearing into the bevel-wheel F, keyed on the screw $f$, upon which the said bed-plate runs, as in ordinary planing-machines. The clutch D is brought alternately into gear with either clutch-box by the now-to-be-described arrangement.

Adjustable upon a rib on the under part of the bed-plate A are strikers $d$ $d'$, which are not in the same vertical plane, as seen in Fig. 3. Upon a short shaft projecting from the framing of the machine is mounted a bevel-wheel, G, having at its back two horns, $g$ $g'$, one of which lies in the path of the striker $d$, and the other in that of the striker $d'$. The bevel-wheel G gears with a wheel, H, mounted upon the shaft $h$, turning in bearings projecting from the framing, the said shaft having keyed to its other end a lever, I, which is connected by rods $i$ $i$, as shown clearly in Fig. 4, with the tail of the clutch-shifter. At the end of each traverse of the bed-plate one or the other of the strikers $d$ $d'$ will, by striking one or the other of the horns $g$ $g'$, cause the wheel G to receive a motion of partial rotation in one or the other direction, which motion will be transmitted, through the wheel H, shaft $h$, lever I, and connecting-rods $i$ $i$, to the tail of the clutch-shifter $e$, whereby the clutch will be withdrawn from the clutch-box of the open band-pulley and engaged with that of the cross-band pulley, or vice versa, at the termination of each traverse of the bed-plate, and thus the change of the traversing motion of the bed-plate A is effected through the shaft C, wheels E F, and screw $f$, being alternately rotated by the pulleys $c$ $c^1$ in opposite directions. The weighted lever $i'$ is connected with the rods $i$, to insure the engagement of the clutch with the clutch-boxes of the pulleys.

The upper part of the machine consists of a framing, B, hung upon sleeves or center-pieces $b^1$ $b^1$, turning in bearings $k$ $k$ upon a slider or table, K, movable upon a slide, L, mounted upon pillars $l$ $l$. The fore part of said framing B overhangs the bed-plate A, and carries at the center of its cross-head B' the guiding-point M, adjustable vertically by a screw, $m$.

On either side of the said guiding-point are arranged the spindles N, which carry the carving-tools $n$.

Figure 6:
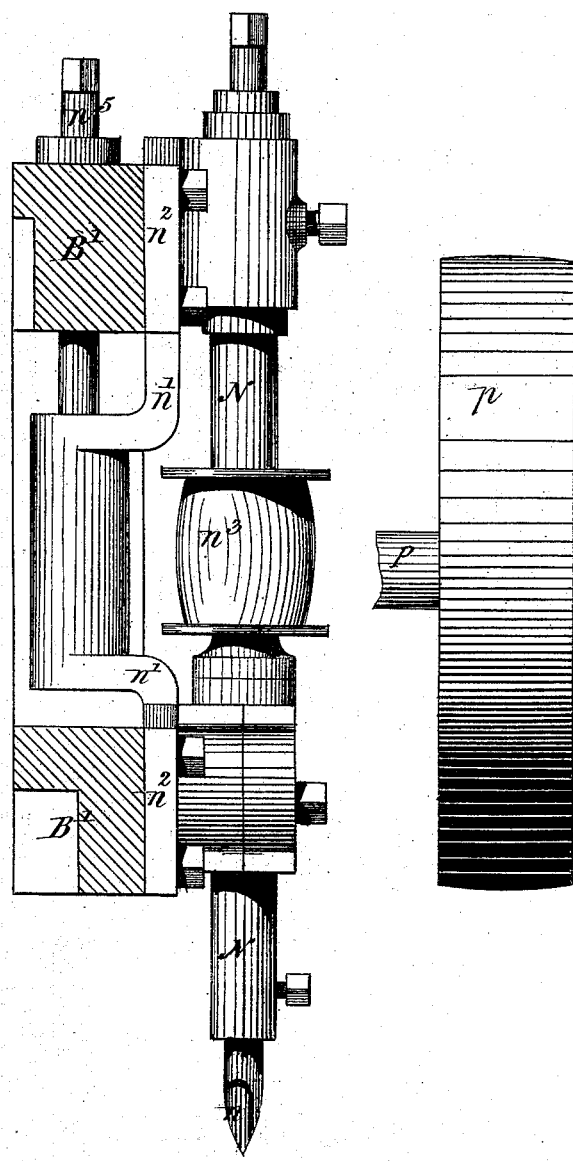

Fig. 6 represents a cross-section of the head B', and a side elevation of one of the spindles N. The said spindles N are mounted in carriers $n^1$, which slide in guides $n^2$, bolted to the said head. By means of screws $n^5$, passing through the head, the spindles may be adjusted to a height which will bring the points of the carving-tools and the guiding-point M all in the same horizontal line. Each spindle is provided with a pulley, $n^3$. A rapid rotatory motion is given to the said spindles, and to the tools carried in them, by means of the bands $n^4$ from pulleys $p$, (one for each spindle,) mounted upon a shaft, P, turning at either end in bearings $p^1$ in the sleeves $b^1$, upon which the framing B turns, and at its center in a bearing, $p^2$.

The shaft P is driven by a band (from the driver from which the machine is driven) passing over the pulley $p^3$ upon the said shaft.

Figure 7:
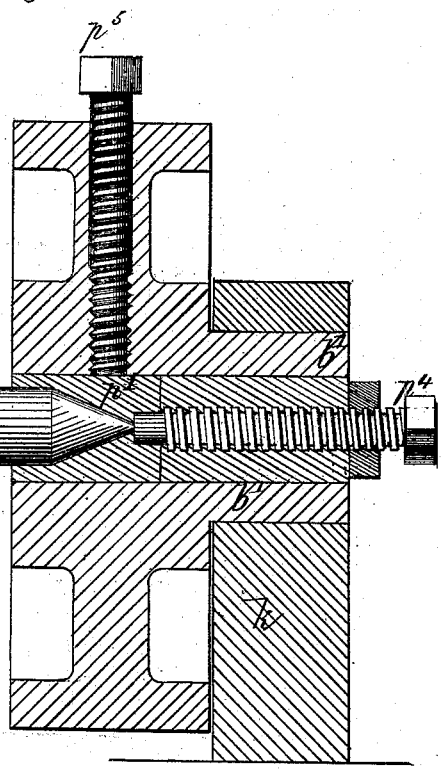

Fig. 7 is a section of one side of the framing B and one of the bearings $k$, in which its sleeves turn. This figure also shows one of the end bearings, $p^1$, for the shaft P, the said bearings being adjustable by the screw $p^4$, to compensate for wear. The screw $p^5$, passing through the framing B, holds the bearing $p^1$ firmly in position. By thus mounting the framing B and the shaft P so that they both turn upon the same center, the motions of the spindle-driving pulleys $p$ and the framing B do not interfere with each other—that is to say, during the oscillations of the framing B, caused by the traveling of the guiding-point M over the pattern, the pulleys $p$ and those of the spindles always remain at the same distance from each other, and consequently the driving-bands $n^4$ are always at the same tension. The rear part of the framing B carries counterbalance-weights $b^2$, which are so proportioned that the preponderance in weight of the fore part of the framing B is only such as is necessary to allow the requisite penetration of the tools $n$ into the material being operated upon. At the side of the bed-plate A are inclined pieces J J', adjustable vertically in holders $j\,j^1$, which are again adjustable to a greater or less distance from each other in a slide, $j^2$, bolted to the bed-plate A.

Upon the framing B is a projecting piece, $j^3$, which, at the termination of the forward traverse of the bed-plate, comes into contact with the inclined surface J, and raises the fore part of the said framing, so as to elevate the tools out of contact with the material under operation upon the bed-plate A during the back traverse of the said bed-plate, the said fore part being held in its raised position during such back traverse by the catch $b^3$ on the rear part taking under a projecting piece, $l'$, from the framing or from the slider. At the termination of the back traverse of the bed-plate A, a striker, $a'$, coming into contact with the tail of the catch $b^3$, releases the said catch from the projecting piece $l'$, allowing the carving-tools to descend to their work, the projecting piece $j^3$ falling upon the incline J', by which the tools are allowed to descend gently.

The striker $a'$ is bolted to the bed-plate A in such manner as to be adjustable in the length of its projection from the said bed-plate to come into contact with the tail of the catch $b^3$ at any required period of the back traverse of the bed-plate.

The side movement requisite to bring the guiding-point and tools at each forward traverse of the bed-plate to a fresh line or portion of the pattern and of the pieces of materials under operation is given to the table K carrying the framing B, by means of a bevel-wheel, $q$, affixed to the shaft $h$, and deriving its motion from the rotation of the said shaft under the action of the strikers $d\,d'$ upon the horns $g\,g'$, as described with regard to the mechanism for reversing the motion of the bed-plate A. The said wheel $q$ gears with another bevel-wheel, $r$, upon a shaft, $s$, turning in bearings $t$. To the end of this shaft $s$ is keyed a lever, $s^1$, which, through a rod, $s^2$, operates a bell-crank lever, $s^3$, carrying a pawl, $s^4$, which gears with a toothed wheel, $s^5$, affixed to the end of a screw, Q, upon which the sliding table K travels. Thus, at each alternate traverse of the bed-plate, a slight side movement is given to the framing B, carrying the guiding-point and the carvers' tools, which are thus brought over a fresh line or portion of their work.

I will now proceed to describe the action of the machine: A pattern of the design to be reproduced, formed of iron or of other suitable hard material—namely, one which will resist the penetration of the guiding-point M—having been fixed upon the bed-plate A, underneath the said guiding-point, the pieces of wood or other material upon which the design is to be reproduced (previously brought to a thickness about equal to the thickness of the pattern at those parts where the ornament thereon is of highest elevation) are fixed, one piece under each tool $n$. The tools $n$ and guiding-point M are adjusted so that their points are all in the same horizontal line.

The inclines J are set in the slide $j^2$ at such distances apart, according to the length of the pattern, as to elevate and lower the fore part of the framing at the termination of each operation of the tools, and the strikers $d\,d'$ are adjusted and fixed upon their ribs at such distances apart, according to the length of the pattern, as that the said strikers will come into contact with their respective horns $g\,g'$ at the termination of each traverse of the table.

From an overhead or other shaft, driven by any suitable motive power, bands are led over the pulleys $c$ and $c^1$ on the shaft C, and over the pulley $p^3$ on the shaft P, the band over one of the pulleys $c\,c^1$ being a crossed band, and the band over the other of the pulleys $c\,c^1$ being an open band, as hereinbefore stated, For the sake of simplicity I suppose the bed-plate A to be at about the extremity of its back traverse, and the catch $b^3$ released from the retaining projection $l'$, so that the fore part of the framing B rests upon the incline J'. The machine being set in motion, the shaft P rotates, driving the pulleys $p$ $p$, and, through the bands $n^4$ $n^4$, the spindles N, carrying the carving-tools $n$, the driving being such that the tools receive a high velocity of motion. The shaft C is also driven by the band passing over the pulley $c$, the clutch D being in gear with the clutch-box of that pulley, as shown in the drawings. The bed-plate A thus receives from the shaft C, through the wheels E and F and the screw $f$, a forward traversing motion, whereby the fore part of the framing B descends gently down the incline J', the guiding-point M coming into contact with the pattern $a$, and the tools $n$ coming into contact with the pieces of material, $b$, upon which the design of the pattern is to be reproduced, the table K of the said framing B being in such a position upon its slide L that the guiding-point and the tools are respectively at one side of the fore part of the pattern and the pieces of material to be operated upon. By the continued forward traverse of the bed-plate A, (the fore part of the framing B being caused by the pattern $a$, traveling underneath the guiding-point M, to rise and fall according as the elevations and depressions of the said pattern pass beneath it,) the tools $n$ are caused, by rising and falling with the said head, to cut the pieces of material underneath them to a greater or less depth, and thus produce a copy upon each of the said pieces of the portion of the design which lies in the path of the line of travel of the guiding-point over the pattern $a$.

At the end of the forward traverse of the bed-plate A, the striker $d'$, striking against the horn $g'$, gives a motion of partial rotation to the wheel G, and, through the wheel H, shaft $h$, lever I, and connecting-rods $i$ $i$, the clutch-shifter $e$ is turned so as to shift the clutch D from the clutch-box of the pulley $c$ to that of the pulley $c^1$. At the same time the motion of the shaft $h$ is transmitted, through the wheels $q$ and $r$, to the lever $s^1$, which, through the rod $s^2$ and lever $s^3$, causes the pawl $s^4$ to give a motion of partial rotation to the wheel $s^5$ and to the screw Q, upon which the table K runs, whereby the said table and the framing B, carried by it, receive a slight side movement, which brings the guiding-point M over a portion of the pattern, and the tools $n$ over a portion of each of the pieces of material beneath them slightly to one side of the portion or line previously traveled over by the said point and tools. The projection $j^3$ on the framing has, during the last portion of the forward traverse of the bed-plate, been urged up the incline J, causing (by the elevation of the fore end of the framing B, and the consequent descent of the rear part) the catch $b^3$ to take under the projection $l'$, whereby the tools $n$ and guiding-point M are held out of contact with the pattern and pieces of material during the back traverse of the bed-plate A. The pulley $c^1$ now being the driving-pulley, in consequence of the clutch D being in gear with its clutch-box, and the said pulley revolving, as it does, in the opposite direction to that of the pulley $c$, the bed-plate A receives a back traversing motion, which may be rendered more rapid than the forward traverse by the pulley $c^1$ being smaller than the pulley $c$, as shown in the drawings. At the termination of this back traverse of the bed-plate A the projection $a'$ from the bed-plate A will strike against the tail of the catch $b^3$ and release it from the projection $l'$, whereby the fore part of the framing B will descend and rest upon the incline J' preparatory to descending again to its work. The striker $d$, coming against the horn $g$, will give a motion of partial rotation to the wheels G H and shaft $h$ in the opposite direction to that given to them at the termination of the forward motion of the bed-plate, and consequently the clutch D will be shifted into the clutch-box of the pulley $c$, to give the forward traverse to the bed-plate. The motion of the shaft $h$ in this reverse direction being imparted through the wheels $q$ $r$, shaft $s$, and levers $s^1$ $s^3$, the pawl $s^4$ is raised over the teeth of the wheel $s^5$ into a position to engage with and turn the said wheel at the termination of the next forward traverse of the bed-plate A, as hereinbefore described. The forward traverse of the bed-plate A causes the guiding-point M and tools $n$ to descend to their work, and the said tools $n$ to carve upon the pieces of material, $b$, under the said tools that portion of the ornament or design which travels under the guiding-point M in its new position, and so on, the machine repeating the already-described motions—viz., the alternate forward and backward traverse of the bed-plate A, the alternate retention and release of the framing B, the shifting of the clutch D, and the slight side movement of the table K, by which, at each alternate traverse of the bed-plate A, the pattern and the pieces of material under operation are brought into positions to travel under the guiding-point and the tools, respectively, in lines which lie slightly to the side of the lines in which they have previously so traveled. The pattern $a$ thus travels under the guiding-point M, and the pieces of material, $b$, under the tools $n$, in a series of parallel lines in the direction of the traverse of the bed-plate A, the tools $n$, by their operation in the said series of parallel lines, producing upon the pieces of wood or other material, $b$, beneath them reproductions of the design or ornament of the pattern $a$ beneath the guiding-point M.

I have illustrated in the drawings a machine constructed to carve eight reproductions of designs at one operation; but it will be evident that the said machine may be constructed to carve a number more or less than eight of such reproductions at one operation. Where the designs are to be reproduced upon pieces of material of greater width than will allow a piece of material to be placed under each of the spindles N, the tools may be removed from, say, every alternate spindle, and those in the remaining spindles will carve four reproductions of the design of the pattern upon these wider pieces of material. Where the design is to be reproduced upon turned or cylindrical work, I mount the pattern and the pieces of wood or other material under operation upon heads or carriers between centers in a manner similar to that in which the material operated upon is mounted in an ordinary turning-lathe, and in place of giving a side movement to the framing B, as described, I give to the said pattern and pieces of material a slight movement of partial rotation at each alternate traverse of the bed-plate A.

I will describe this part of my invention with reference to the reproduction of designs or ornaments upon cylindrical pieces of wood or other material.

Figs. 8, 9, and 10 represent, respectively, in plan and side elevations (taken from opposite sides) a bed-plate, A, provided with mechanism suitable for effecting this last-mentioned movement, the design to be reproduced being upon a cylinder. Heads or carriers R, fastened to the bed-plate A, are provided for the cylindrical pattern $a$, (formed of cast iron or other suitable hard material,) and for each piece of material, $b$, to be operated upon, the said pieces of material being cylinders of a diameter equal to the diameter of the pattern at the highest points of the ornament thereon. The said pattern $a$ and pieces of material, $b$, are mounted in the said heads or carriers R between centers $r$ and $r^1$, so as to be capable of revolving with the centers $r^1$. Each of the said centers $r^1$ has upon it a worm-wheel, $r^2$, with which gear worms $u$ (see Fig. 9) upon a shaft, U, carried in adjustable bearings $u'$ upon the bed-plate. At one end of this shaft U is keyed a toothed wheel, V, the teeth of which, at each alternate traverse of the bed-plate A, striking against a stud, $v$, (see Fig. 10,) projecting from the framing upon which the bed-plate slides, cause a motion of partial rotation to be given to the shaft U, which motion is imparted by the worms $u$ to the wheels $r^2$, and thus to the pattern and pieces of material mounted between the centers of the heads or carriers R, whereby the pattern is fed under the guiding-point and the pieces of material being operated upon under the carving-tools, so that the said tools reproduce the ornament or design by operating in a series of lines parallel with the axes of the cylinders. In order to give the shaft U motion only during each alternate traverse of the bed-plate A, and to prevent it receiving motion on each traverse of the bed-plate—that is, a motion in one direction during, say, the forward movement of the bed-plate, and then a motion in the reverse direction, which would bring the pattern $a$ and pieces of material $b$ back to their original position—I form upon the back of the wheel V ratchet-teeth $v^1$, in which a pawl, $v^2$, engages, to prevent the rotation of the wheel in one direction. To prevent the bed-plate jumping by riding over the stud $v$ when the wheel V is thus prevented from turning, I make the bracket carrying the stud $v$, so that in one direction it will yield against the action of a spring, $v^3$, as will be readily understood by reference to Fig. 10.

Or, the reproduction of designs upon turned or circular pieces of material may be effected by causing the bed-plate A to have, instead of a reciprocating motion, a slow movement in one direction, the pattern and pieces of material having at the same time a rotatory motion imparted to them.

Figs. 11 and 12 represent, in plan and side elevation, respectively, an arrangement suitable for producing these movements. The bed-plate A is driven slowly in one direction by a band passed over the pulley $c$ upon the shaft C, upon which shaft is formed a worm, $c^2$, which gears into a worm-wheel, F', keyed upon the end of the screw $f$, upon which the bed-plate A runs. An extension of the said screw carries a stepped pulley, $f'$, bands from which pass over another stepped pulley, $w$, upon a shaft, W, carried in bearings from any convenient immovable part of the framing of the machine. Upon this shaft is a bevel-wheel, $w^1$, running upon a feather, $w^2$, on the said shaft, which wheel revolves with the said shaft, but is compelled to follow the movement of the bed-plate A by a holder or bracket, $x$, fixed to the said bed-plate, whereby the said wheel $w^1$ is kept in gear with the bevel-wheel $y$ upon the worm-shaft Y during the traverse of the bed-plate. The shaft Y, when the machine is driven, receives a continuous rotatory motion while the bed-plate is receiving a continuous slow traversing movement in one direction. The pattern and pieces of material are mounted in heads or carriers similar to the heads or carriers R, Figs. 8, 9, and 10, and, like them, provided with worm-wheels, with which gear the worms of the shaft Y, so that the said pattern and pieces of material receive continuous rotatory motion from the said worms. In this arrangement the framing B does not receive side movement, as hereinbefore described with respect to Figs. 1 to 5. By these combined motions of the pattern and pieces of material under the guiding-point and tools—namely, that in a line parallel to their axes due to the traverse of the bed-plate and that around their axes—the tools reproduce the design upon the said pieces of material by operating in a helical line.

Figs. 13 and 14 represent, in side elevation and cross-section, respectively, tools which I prefer to employ in reproducing ornaments or designs upon stone. The said tools somewhat resemble an ordinary chisel, but have a narrow cutting-edge. I fix these tools in the fore part of the framing B, in positions to operate upon the work, as hereinbefore described; but I prefer to fix them rigidly therein—that is to say, without giving them rotatory motion similar to that given to the spindles N.

Although, with reference to Figs. 1 to 5, I have described an arrangement for imparting a side movement to the table K, carrying the framing B, yet the side movement might be given to the bed-plate A instead of to the said slider. In this case the bed-plate would be mounted upon an under framing, the said framing sliding backward and forward, (as described with respect to the bed-plate A, Figs. 1 to 5,) carrying the bed-plate A with it. The bed-plate would be capable of running upon a screw on the said framing, in a direction at right angles to the direction of the forward and backward traverse of the under framing carrying the said bed-plate. At the termination of each alternate traverse of the said framing and bed-plate a motion of partial rotation would be given to the said screw upon which the bed-plate runs, so as to feed the pattern and pieces of material carried on the said bed-plate underneath the guiding-point and tools. This could be effected by an arrangement similar to that described with respect to Figs. 8, 9, and 10, the worm-shaft U representing the screw upon which the bed-plate would have its side movement.

It will be evident from the foregoing description that the tools would be capable of operating during both the forward and backward traverse of the bed-plate A by dispensing with the arrangements for the raising and retention in its raised position of the fore part of the framing B, so that the guiding-point and tools would remain in contact with the pattern and material being operated upon. In this case a slight side movement would be given to the framing B, or to the bed-plate A, to bring the guiding-point and tools to a fresh line or portion of the pattern and pieces of material at the termination of each traverse, both forward and backward, of the said bed-plate, instead of at every alternate traverse only. The back traverse, too, would, of course, be effected in this case at the same slow rate as the forward traverse.

I claim—

1. The bed-plate A, sliding in V-shaped groove, and having clamped thereon the pattern $a$, and the material, $b$, on which said pattern is to be reproduced, said bed-plate having forward and backward movement imparted thereto, through shaft C, by the operation of pulleys $c$ $c^1$, bevel-wheels E F G H, horns $g$ $g'$, strikers $d$ $d'$, levers I $i'$, rods $i$, and clutch D, substantially as set forth.

2. The oscillating framing B, hung upon sleeves or center-pieces $b^1$, and carrying at the center of its cross-head B' the vertically-adjustable point M, and on either side of said point the adjustable spindles N, carrying the carving-tools $n$, said spindles being mounted in carriers $n^1$, sliding in guides $n^2$, and being provided with a pulley, $n^3$, through which rotary motion imparted to a band, $n^4$, from pulleys on shaft P is communicated to said spindles, substantially as set forth.

3. The table-supporting screw $f$, worm-wheel and worm F' $c^2$, and shafts W and Y, arranged and operating substantially as and for the purposes set forth.

4. The shaft P, mounted in bearings $p^1$, said bearings being capable of adjustment to compensate for wear by screws $p^4$, and being held firmly in position by the screws $p^5$, substantially as set forth.

5. The inclined surfaces J J', adjustable vertically in holders $j$ $j^1$, and the projecting piece $j^3$, carried by the framing B, for raising the tools out of contact with the work, substantially as set forth.

6. The catch $b^3$, projection $l'$, and striker $a'$, for holding the forward portion of the framing in elevated position and releasing it therefrom at the proper time, substantially as set forth.

7. The bevel-wheels $q$ $r$, mounted on shafts $h$ $s$, lever $s^1$, pawl $s^4$, and toothed wheel $s^5$, for imparting a slight side movement to the framing B and table K, and thereby causing the point M and the tools $n$ to operate upon a fresh surface, as explained.

8. The table K, carrying the framing B, and operated by the screw Q to move upon the slide L, as and for the purpose set forth.

In testimony whereof I have signed my name to this specification in the presence of two subscribing witnesses.

JOHN POLLOCK. [L. S.]

Witnesses:
  DAVID DRYSDALE AUSTIN,
  ROBERT ADAM GUNN.